(12) United States Patent
Humphryson

(10) Patent No.: US 6,378,559 B1
(45) Date of Patent: Apr. 30, 2002

(54) DISCHARGE OUTLET CONTROL

(76) Inventor: Ian George Humphryson, 8 Whatman Way, Clifton Park, West Aust (AU), 6233

( * ) Notice: Subject to any disclaimer, the term of this patent is extended or adjusted under 35 U.S.C. 154(b) by 0 days.

(21) Appl. No.: 09/673,215
(22) PCT Filed: Mar. 18, 1999
(86) PCT No.: PCT/AU99/00187
  § 371 Date: Oct. 13, 2000
  § 102(e) Date: Oct. 13, 2000
(87) PCT Pub. No.: WO99/52797
  PCT Pub. Date: Oct. 21, 1999

(30) Foreign Application Priority Data

Apr. 15, 1998  (AU) ............................................... PP2969

(51) Int. Cl.[7] ............................ F15D 1/02; F16K 15/14
(52) U.S. Cl. ........................... 137/849; 138/39; 138/44
(58) Field of Search ................................ 137/849, 846; 138/37, 39, 44

(56) References Cited

U.S. PATENT DOCUMENTS 4,190,910 A * 3/1980 Teglund et al. ......... 137/403 X
5,592,966 A * 1/1997 Gates ..................... 137/849 X

FOREIGN PATENT DOCUMENTS

| DE | 32 12 617 | 10/1983 |
| DE | 42 16 952 | 11/1993 |
| GB | 2 014 530 | 8/1979 |

* cited by examiner

Primary Examiner—Kevin Lee
(74) Attorney, Agent, or Firm—Rothwell, Figg, Ernst & Manbeck

(57) ABSTRACT

A discharge flow control includes a plurality of flexible elongate elements adapted to be supported at one end from a discharge outlet to extend from the outlet in the direction of the discharge and across the flow path of the discharge outlet.

11 Claims, 7 Drawing Sheets

DISCHARGE OUTLET CONTROL

FIELD OF THE INVENTION

The present invention relates to a dispersal means which can be utilised with discharge outlets.

A particular application of the invention relates to modification of discharge outlets which are utilised in carrying fluid materials during mineral processing where the fluid material (which may be particulate materials., slurries or liquids) are delivered from an outlet into a hopper chute or the like. A further application relates to circumstances where a fluid is delivered into a body of liquid

BACKGROUND

It has been found that the delivery of a fluid material from the discharge outlet can result in significant wear on the components on which the fluid material is incident and in the case of abrasive fluid materials the wear can be quite significant and can result in the premature destruction of the components utilised in the conveying of the fluids.

In addition where a fluid material is delivered from an outlet into a body of liquid the discharge often results in air being carried into the liquid as the fluid material enters the liquid and this can be particularly evident as the velocity of the discharge into the liquid increases. The entry of air into the body of liquid can create difficulties where the body of liquid is associated with a pump or where it is desired that there be some settling of the fluid material being delivered into the liquid.

It is an object of this invention to provide a means which is able disperse and or reduce the velocity of the fluid flow from discharge outlets without significantly adversely affecting the discharge rate from the outlet.

DISCLOSURE OF THE INVENTION

Accordingly the invention resides in a discharge flow control means comprising a plurality of flexible elongate elements adapted to be supported at one end from a discharge outlet to extend from the outlet in the direction of the discharge and across the flow path from the discharge outlet.

According to a preferred feature of the invention, the elongate elements are adapted to be located around the perimeter of discharge outlet. According to one embodiment the elongate elements surround the discharge outlet.

According to a preferred feature of the invention elongate elements are resiliently flexible. According to one embodiment the elongate elements are formed of an elastomeric or elastomeric-like material.

According to a further preferred feature of the invention the elongate elements are formed with openings along their length.

According to a further preferred feature the discharge control means comprises a substantially square or rectangular panel of sheet material formed with a plurality of transversally spaced slits extending from one end and terminating short of the other end and which define said elongate elements therebetween, said other end of said length of sheet material being adapted to be applied to the discharge outlet.

According to an alternative preferred form the elongate elements are supported at each end to substantially opposed sides of the discharge outlet whereby the central portion of the elongate elements lie across the flow path from the discharge outlet. According to an embodiment of the invention the discharge control means comprises a substantially square or rectangular panel formed with a plurality of transversally spaced slits each terminating short of each end of the sheet material and which define said elongate elements therebetween, the ends of said length of sheet material being adapted to be applied to the discharge outlet in opposed relation to each other.

According to an alternative preferred form the elongate elements comprise at least two sets of elongate elements wherein each set of elongate elements are supported at each end to substantially opposed sides of the discharge outlet whereby the central portion of each set of elongate elements lie across the flow path from the discharge outlet and wherein the ends of the sets of elongate elements are angularly offset from each other around the discharge outlet and the central portions of the sets overlap.

The invention will be more fully understood in the light of the following description of several specific embodiments.

BRIEF DESCRIPTION OF THE DRAWINGS

The description is made with reference to the accompanying drawings of which.

DESCRIPTION OF SEVERAL SPECIFIC EMBODIMENTS OF THE INVENTION

Figure 1:
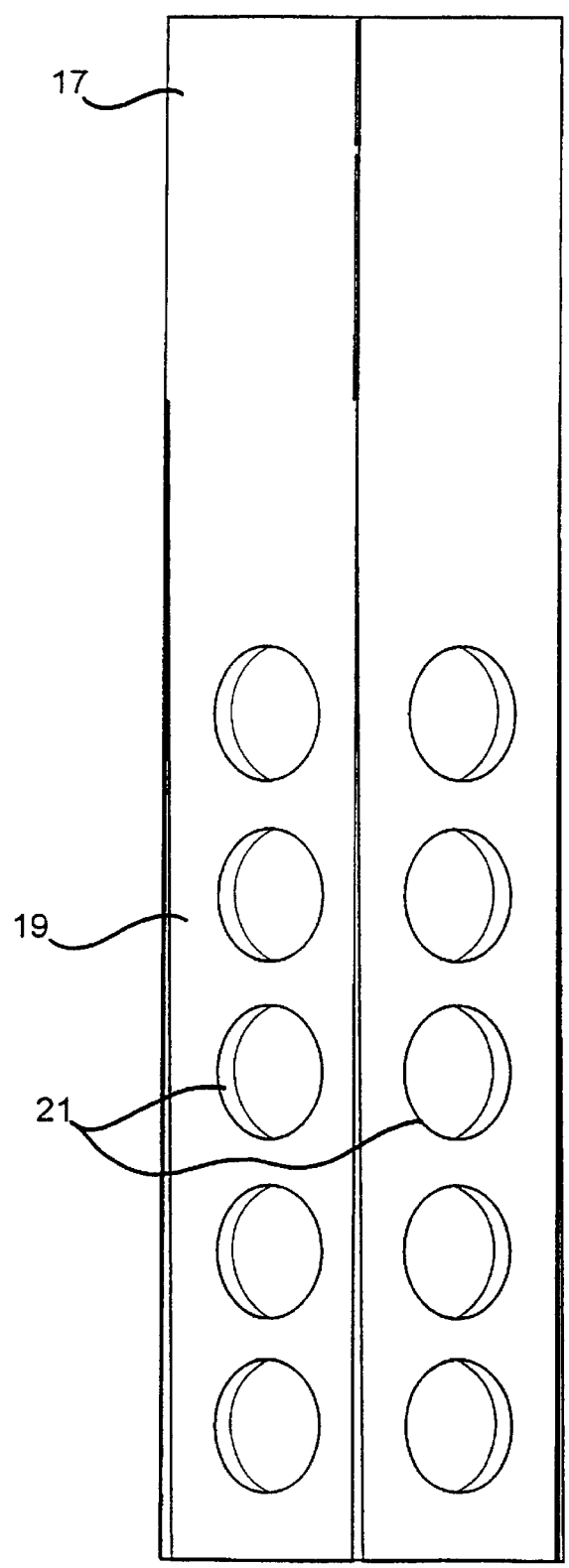
FIG. 1 is a side elevation of the first embodiment.
Figure 2:
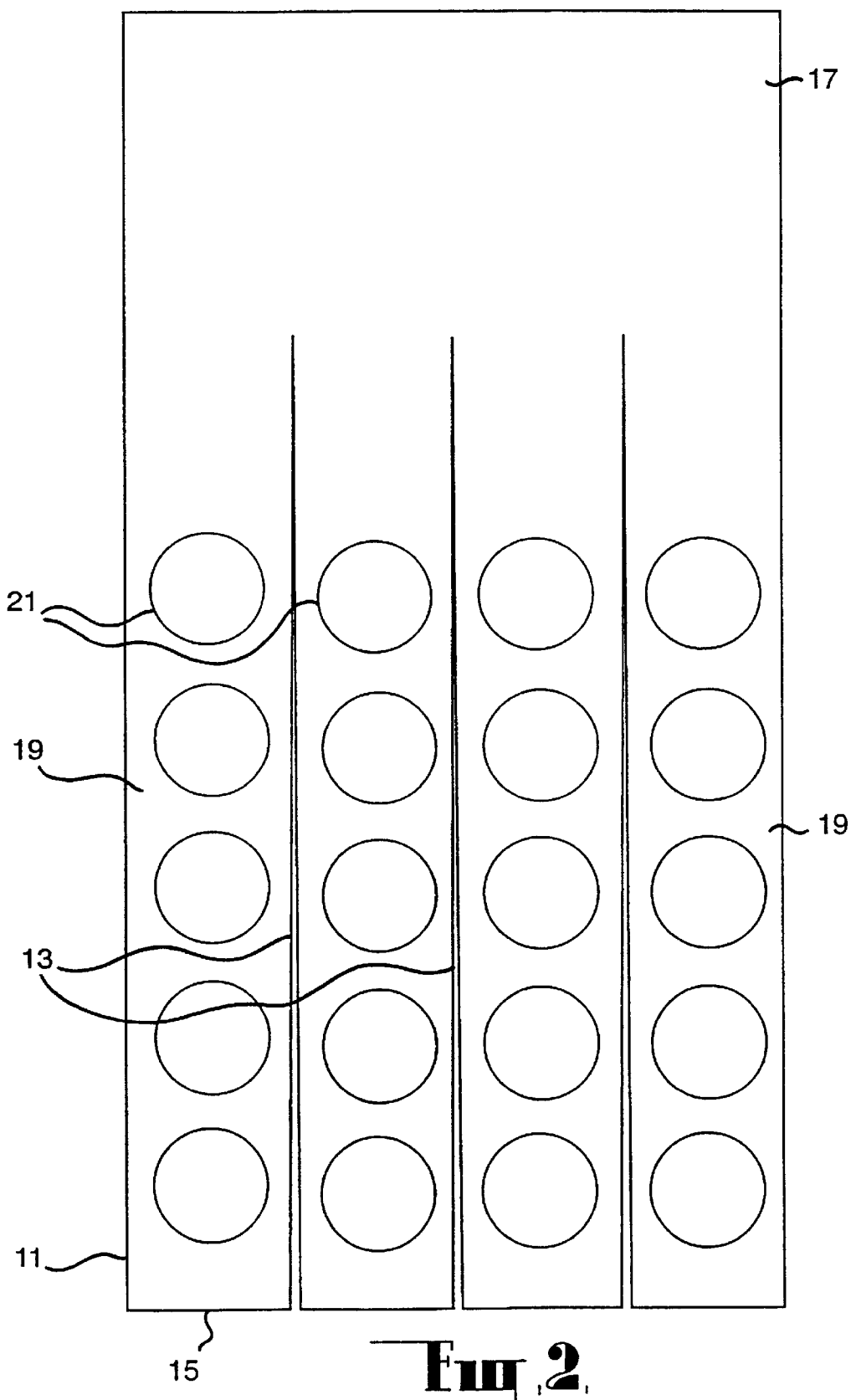
FIG. 2 is a plan view of the first embodiment prior to application around a chute.
Figure 3:
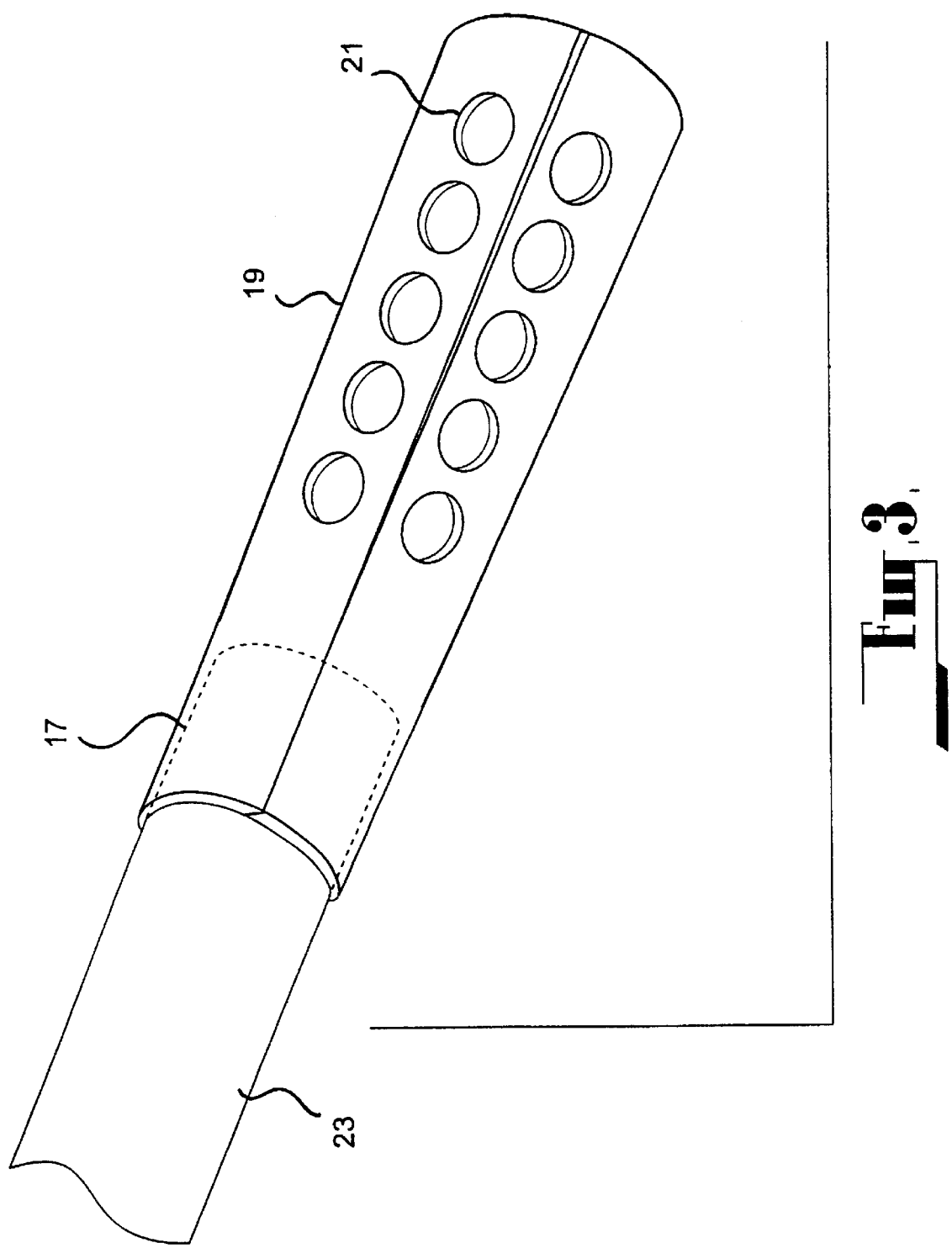
FIG. 3 is a schematic view of the first embodiment in use.

The first embodiment is directed to a discharge control means for utilisation with a discharge outlet. The first embodiment comprises a sheet of an elastomeric-like material which may be formed from artificial or natural rubber, polyurethane a like elastomeric material which has a generally square or rectangular shape and which is formed with a plurality of slits 13 extending from one end 15 and terminating short of the other end 17 and which serve to form a plurality of elongate elements 19. A number of openings 21 are provided along the length of each of the elongate elements 19. The other end 17 is adapted to be applied around a chute to form a substantially cylindrical member as shown at FIGS. 1 and 3 whereby the elongate elements 19 extend from the chute 23.

The first embodiment has particular application for use with chutes which have a discharge which is inclined to the horizontal axis. Because of their flexible nature the elongate elements have a natural tendency to depend downwardly from the outer end of the chute 23 and thus to lie across the outlet. This tendency brings the elongate elements 19 into contact with the fluid flow being discharged from the outlet 23 which results in the fluid flow being dispersed. As a result the elongate elements serve to reduce the impact velocity of the fluid flow onto the elements with which the flow makes contact and the distribute the fluid flowing from the discharge outlet over a wider area than would otherwise be the case, without significantly inhibiting the fluid flow from the outlet.

Figure 4:
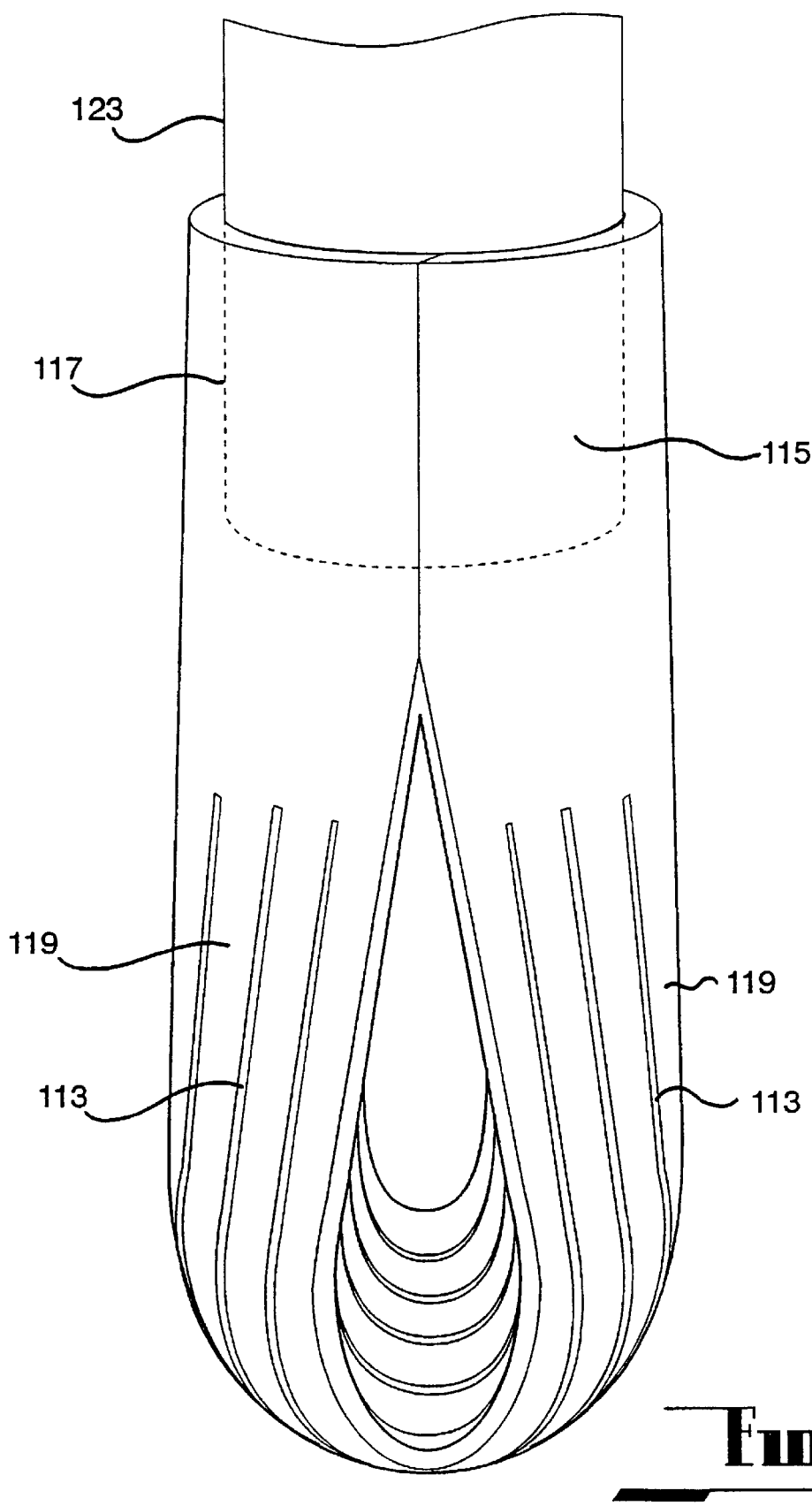
FIG. 4 is a schematic isometric view of a discharge outlet accommodating the second embodiment.
Figure 5:
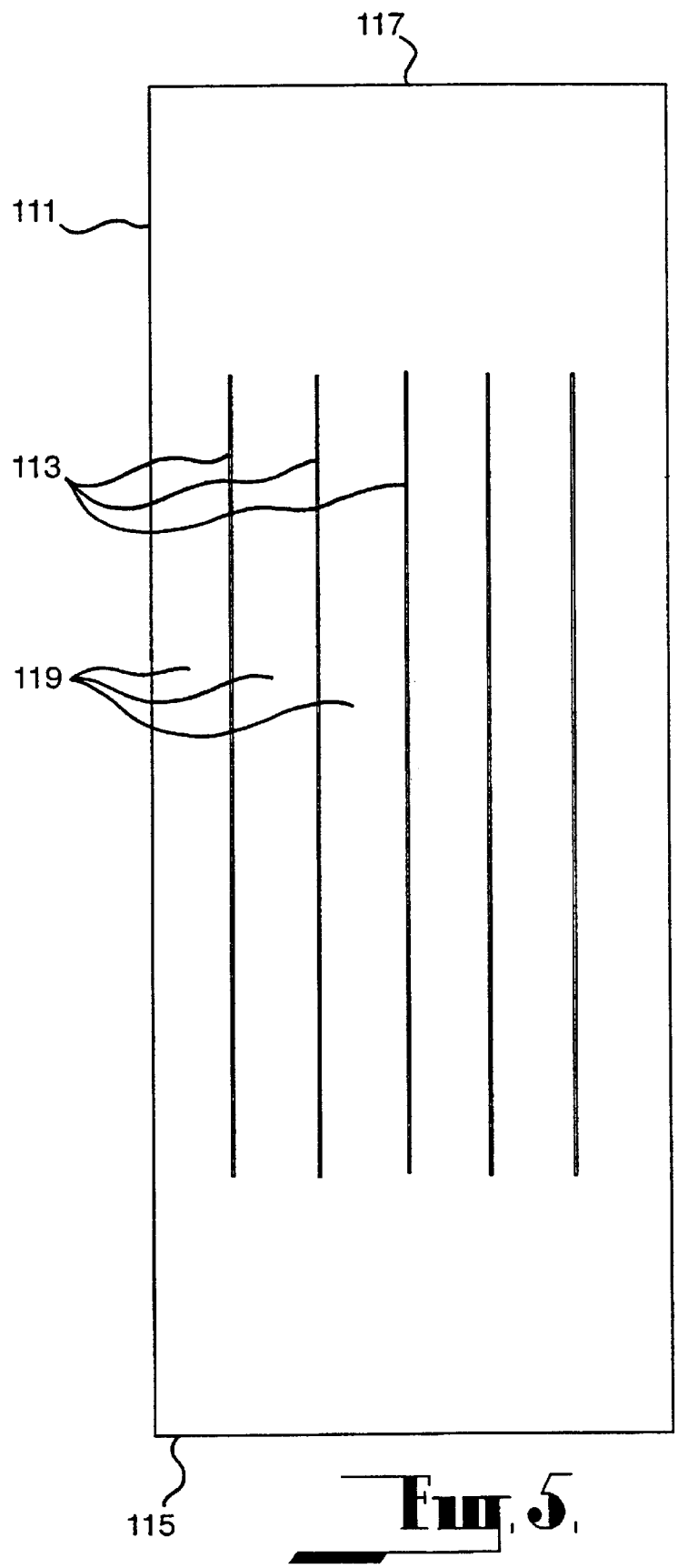
FIG. 5 is a plan view of the second embodiment prior to application around a discharge outlet.

The second embodiment as shown at FIGS. 4 and 5 is formed from a panel 111 of sheet material which again may be formed of artificial or natural rubber or polyurethane or a like elastomeric material. The panel 211 is of a generally rectangular shape and is formed with a plurality of transversally spaced slits 113 each of which terminate short of each end 115 and 117 to define the elongate elements 119 therebetween. The ends 115 and 117 of the panel 111 are adapted to be applied around the chute 123 in opposed relation such that the intermediate portion of each of the elongate elements 119 lie across the flow path from and discharge chute 123.

The second embodiment has particular application to outlets which are of a generally vertical orientation whereby the fluid flow from the discharge outlet is directed generally downwardly. The presence of the elongate elements below the discharge outlet 123 serves to disperse the discharge without significantly impeding the flow from the discharge and developing any back pressure on the discharge outlet. As a result of the embodiments the velocity with which the fluid flow impacts with the components onto which the fluid flow is directed is significantly reduced and the area of impact is greatly increased which results in a significant reduction in the degree of wear on such components.

Figure 6:
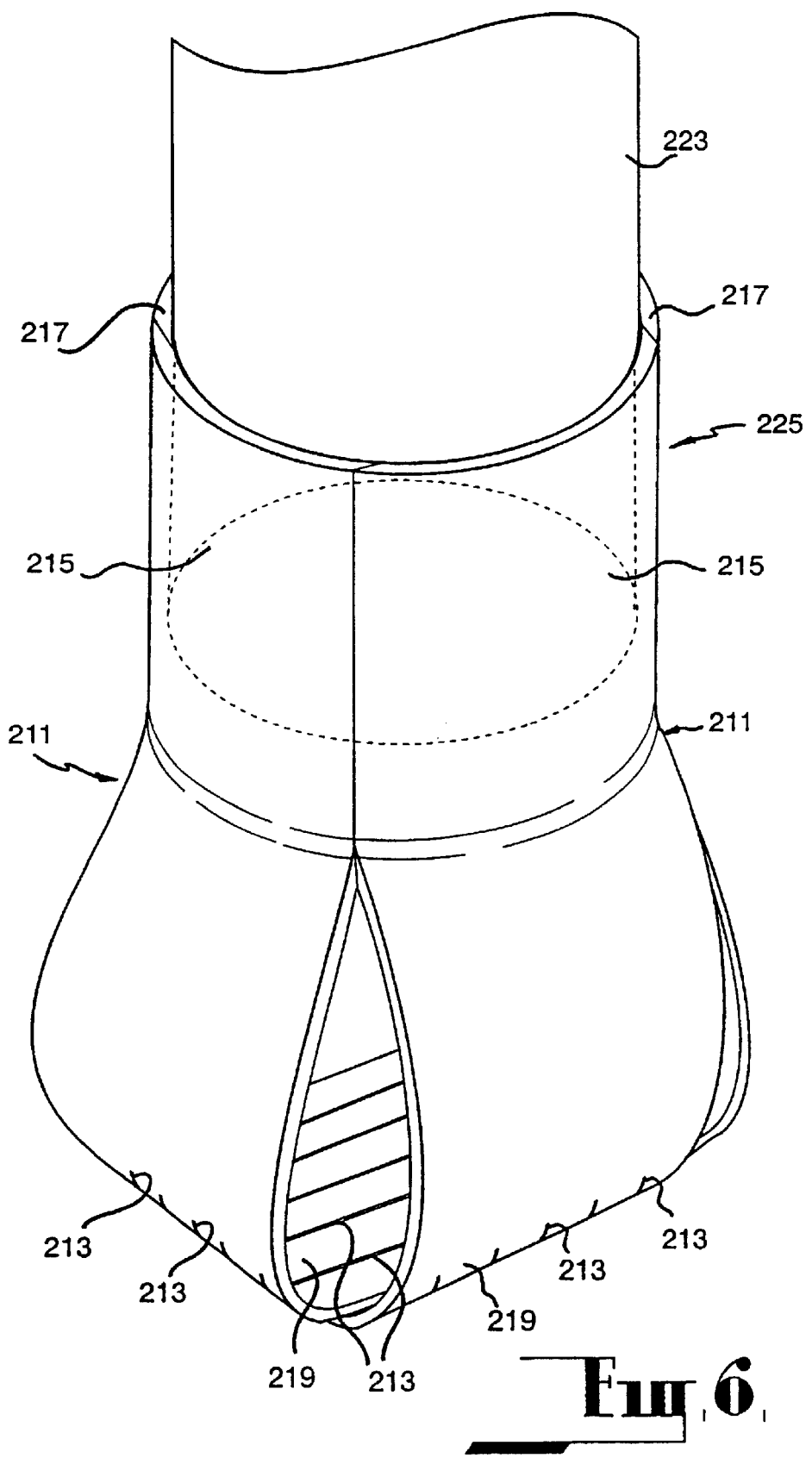
FIG. 6 is an upper isometric view of the third embodiment of the invention.
Figure 7:
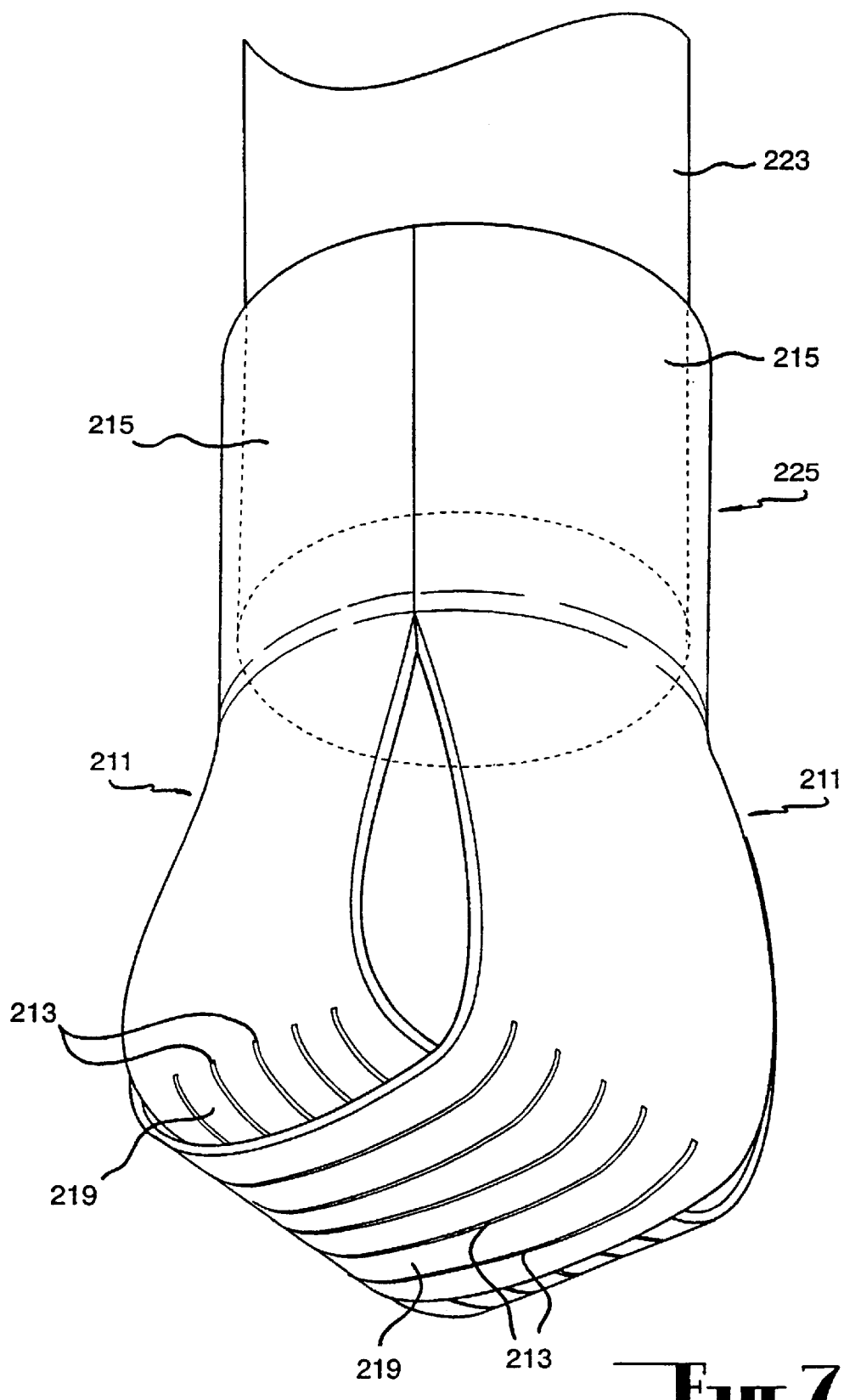
FIG. 7 is an underneath isometric view of the third embodiment of the invention.

The third embodiment as shown at FIGS. 6 and 7 is generally of a similar form to that of the second embodiment in that is comprises two panels 211 which are each of a generally rectangular shape and each panel is formed with a plurality of transversally spaced slits 213 each of which terminate short of each end 215 and 217 and which define the elongate elements 219 therebetween. The ends 115 and 117 of each of the panels 211 interconnected in a side by side relationship to define a tubular portion 225 whereby the ends 215 and 217 of each panel are in opposed relation to each other and the intermediate portion of each panel which comprises the central portion of the elongate elements 219 lie across the tubular portion 225 in an overlapping relationship as shown. The tubular portion is adapted to be able to be applied around a discharge chute (not shown) such that the central portion of the elongate elements 219 lie in an overlapping relationship across the fluid flow path from discharge chute 223.

It has been found that the third embodiment has application in use with discharge outlets which are delivering fluid into a body of liquid. As a result of the use of the embodiment the velocity of the fluent material, on entry into the liquid, is significantly reduced and consequently the amount of air which is carried into the liquid is reduced. As a result the operating characteristics of any pumps associated with the liquid are not adversely influenced by the presence of air in the liquid being pumped.

Throughout the specification, unless the context requires otherwise, the word "comprise" or variations such as "comprises" or "comprising", will be understood to imply the inclusion of a stated integer of group of integers but not the exclusion of any other integer or group of integers.

It should be appreciated that the scope of the present invention need not be limited to the particular scope of the embodiments described above.

The claims defining the invention are as follows:

1. A discharge flow control means comprising a plurality of flexible elongate elements adapted to be supported at one end from a discharge outlet to extend from the outlet in the direction of the discharge and across the flow path at its position spaced outwardly from the discharge outlet whereby the discharge flow control means does not significantly affect the rate of discharge from the outlet.

2. A discharge flow control means as claimed at claim 1 wherein the elongate elements are adapted to be located around the perimeter of discharge outlet.

3. A discharge flow control means as claimed at claim 1 wherein the elongate elements surround the discharge outlet.

4. A discharge flow control means as claimed at claim 1 wherein elongate elements are resiliently flexible.

5. A discharge flow control means as claimed at claim 1 wherein the elongate elements are formed of an elastomeric material.

6. A discharge flow control means as claimed at claim 1 wherein the elongate elements are formed with openings along their length.

7. A discharge flow control means as claimed at claim 1 comprising a substantially square or rectangular panel of sheet material formed with a plurality of transversely spaced slits extending from one end and terminating short of the other end and which define said elongate elements therebetween, said other end of said length of sheet material being adapted to be applied to the discharge outlet.

8. A discharge flow control means as claimed at claim 1 wherein the elongate elements are supported at each end to substantially opposed sides of the discharge outlet whereby the central portion of the elongate elements lie across the flow path from the discharge outlet.

9. A discharge flow control means as claimed at claim 8 wherein the discharge control means comprises a substantially square or rectangular panel of sheet material formed with a plurality of transversely spaced slits each terminating short of each end of the sheet material and which define said elongate elements therebetween, the ends of said length of sheet material being adapted to be applied to the discharge outlet in opposed relation to each other.

10. A discharge flow control means as claimed at claim 1 wherein the elongate elements comprise at least two sets of elongate elements wherein each set of elongate elements are supported at each end to substantially opposed sides of the discharge outlet whereby the central portion of each set of elongate elements lie across the flow path from the discharge outlet and wherein the ends of the sets of elongate elements are angularly offset from each other around the discharge outlet and the central portions of the sets overlap.

11. Discharge flow control means as claimed at claim 10 wherein the discharge control means comprises at least two substantially square or rectangular panels of sheet material formed with a plurality of transversely spaced slits each terminating short of each end of the sheet material and which define the sets of elongate elements therebetween, the ends of the lengths of sheet material being adapted to be applied to the discharge outlet in opposed relation to each other.

* * * * *